Patented Sept. 14, 1948

2,449,360

UNITED STATES PATENT OFFICE 2,449,360

PREPARATION OF HIGHLY HALOGENATED FLUOROALKANES

Paul Rolland Austin, Wilmington, Del., assignor to E. I. du Pont de Nemours & Company, Wilmington, Del., a corporation of Delaware No Drawing. Application August 11, 1943, Serial No. 498,253

8 Claims. (Cl. 260—653)

This invention relates to a process for the preparation of chlorofluoroalkanes.

It has been known for some time that higher fluorinated propanes bearing a number of chlorine atoms may be prepared by reacting the appropriate chlorinated hydrocarbon with a fluorinating agent, such as dichloroantimony trifluoride, during which process chlorine atoms are replaced by those of fluorine. Processes of this type are complicated, however, by the fact that several steps are required to reach the final product. For example, the art discloses the synthesis of the required intermediate chlorinated propanes through condensation of such molecules as chloroform or carbon tetrachloride with trichloroethylene or tetrachloroethylene in the presence of aluminum chloride according to the method originated by Prins. (See Rec. Trev. Chem. 51, 1065 (1932), 54, 249 (1935), 56, 119 (1937), 57, 659 (1938).) The resultant chlorinated propane is then subjected to fluorination by suitable agents such as the above-described dichloroantimony trifluoride. In many instances these fluorinations proceed only with difficulty and in low yields. Moreover, it has been stated by Henne (See J. Am. Chem. Soc., 60, 1697 (1938), 60, 2491 (1938).) that the Prins method cannot be extended to the condensation of fluorinated molecules of methane and ethylene and "that it would be futile to use aluminum chloride to effect condensations between a fluorinated derivative and either an aliphatic or an aromatic compound."

It is, therefore, an object of this invention to provide a simple one-step process for the preparation of highly halogenated fluoroalkanes.

Other objects will be apparent from the following description of the invention.

The object of this invention has been obtained by reacting in the presence of a Friedel-Crafts catalyst a halogenated methane containing at least three halogen atoms with a halogenated ethylenic compound having at least one chlorine atom attached to one of the doubly bonded carbon atoms and in which at least one of the reactants contains at least one fluorine atom.

It has been discovered that halogenated methanes and halogenated ethylenic compounds of the type described above in which at least one of the reactants contains at least one fluorine atom react spontaneously provided there is present in the reaction mixture a catalytic agent. The preferred catalyst in this invention is aluminum chloride. The preferred method of carrying out the process consists in mixing the reactants with the catalytic agent at a relatively low temperature. The products may be conveniently isolated by washing with water to decompose the catalytic agent, followed by distillation at ordinary or reduced pressure. The practice of this invention may be more adequately illustrated by the following examples.

Example I

Dichloromonofluoromethane (102 parts) is allowed to distill slowly into a well-stirred mixture of tetrachloroethylene (166 parts) and aluminum chloride (26.5 parts) at an initial temperature of 30° C. over a period of 30 minutes. When the reaction is complete the product is washed with cold water, dried over calcium chloride and distilled. A small amount (15 parts) of chloroform together with 60 parts of unreacted tetrachloroethylene is recovered after which there is obtained a 58% yield of monofluorohexachloropropane, boiling at 209–211° C., for 126° C. at 22 mm., $n_D^{25}$: 1.5072. Analysis: Calculated for $C_3HCl_6F$: Cl, 79.14; Found: Cl, 78.45.

Example II

A silver-lined, high pressure tube is charged with 180 parts of chloroform and 26.5 parts of aluminum chloride. It is then cooled in a carbon dioxide-acetone mixture, evacuated and 115 parts of chlorotrifluoroethylene is added by distillation from a cylinder. Agitation is provided by placing the tube in a mechanical shaking device, and the temperature is slowly raised to 50° C. After two hours at this temperature, the tube is cooled and the unreacted portion of the chlorotrifluoroethylene is bled off and recovered. The reaction mixture is drowned on ice to decompose the catalyst, and the product is washed with water, dried and distilled. After recovery of the unreacted chloroform, a tetrachlorotrifluoropropane boiling at 127° C. and having a refractive index, $n_D^{20}$, of 1.4189, and a pentachlorodifluoropropane boiling at 71–72° C. at 25 mm. and having a refractive index, $n_D^{20}$, of 1.4621 are obtained. Analysis: Calc'd. for $C_3HCl_4F_3$: Cl, 60.2; F, 24.15; Found: Cl, 60.64; F, 23.55. Calc'd. for $C_3HCl_5F_2$: Cl, 70.3; F, 15.05; Found: Cl, 67.12; F, 14.8.

Example III

A high-pressure reactor is charged with 288 parts of carbon tetrachloride and 10 parts of aluminum chloride. It is then closed, cooled in a carbon dioxide-acetone mixture, evacuated and 50 parts of chlorotrifluoroethylene is added by distillation from a cylinder. The reactor is heated at 65° C. for 8 hours while agitating. It is then cooled, opened and the reaction mixture is poured on ice and the product repeatedly washed with water, dried and distilled. There is obtained 10 parts of a pentachlorotrifluoropropane boiling at 153° C. and 28 parts of a hexachlorodifluoropropane boiling at 195–197° C.

It will be understood that this invention is not limited by the examples cited above. The preferred ethylenic compounds are those carrying chlorine atoms on the double bonded carbon atoms because of the combined features of great reactivity, favorable physical properties and ease of operation. However, it will be evident that other ethylenic compounds of the type

where R, R₁ and R₂ are hydrogen, chlorine, alkyl or chlorinated alkyl, and X is chlorine are also operable in this process. Thus compounds such as trichloroethylene, tetrachloroethylene, sym. dichloroethylene, 1,2-dichloro-3-trifluoro-1-propene, 1,1,2-trichloro-3-trifluoro-1-propene, 1-dichloro-3-trifluoro-1-propene, 1,2,3-trichloropropene, vinyl chloride, 1,2-dichloro-1-hexene, 1,1,3,-3,3-pentafluoro-2-chloro-1-propene, asym.-difluorodichloroethylene, sym. dichlorodifluoroethylene, trifluorochloroethylene and sym. dibromoethylene are operable in this process. The preferred catalyst is aluminum chloride because of its great activity, and because of the rapidity with which the reaction can be accomplished in the presence of this agent. However, any Friedel-Crafts catalyst, such as boron trifluoride, zinc chloride or ferric chloride can also be used.

The present process permits a successful operation over a relatively wide temperature range. It is preferred to operate at normal or slightly elevated temperatures since the disproportionation which occurs at the higher temperatures is greatly reduced. In general, temperatures ranging from 15 to 100° C. are employed, although temperatures up to 150° C. may be used.

The preferred method of isolation of the reaction products is by distillation after the catalytic agent has been decomposed with ice or cold water.

The outstanding advantage of this invention, over those described in the prior art, is that it provides a one-step process for the preparation of highly halogenated fluoroalkanes from readily available starting materials. For example, such materials as dichloromonofluoromethane, dichlorodifluoromethane, trichloroethylene and tetrachloroethylene, from which desirable higher condensation products are obtainable by means of this process, are now commercially available. Moreover the simplicity of operation of this process lends itself readily to the commercial utilization of these reaction products for which broad uses are constantly being developed.

The products obtained by means of the above-described process are useful as petroleum chemicals, dielectric fluids and cooling liquids.

As many apparently widely different embodiments of this invention may be made without departing from the spirit and scope thereof, it is to be understood that this invention is not to be limited to the specific embodiments shown and described.

The present application is a continuation-in-part of my earlier application, Serial No. 462,749, filed October 20, 1942, for Preparation of Chlorofluoralkanes which is now abandoned.

I claim:

1. The process for the preparation of highly halogenated alkanes, which comprises bringing into admixture, in the presence of a Friedel-Crafts catalyst, a halogenated methane containing at least 3 halogen atoms attached to the carbon, not more than one of the halogen atoms being a fluorine atom, and a halogenated ethylenic compound having at least one chlorine atom attached to one of the doubly bonded carbon atoms, said halogenated methane and said halogenated ethylenic compound being further characterized in that at least one of them contains at least one fluorine atom.

2. The process for the preparation of highly halogenated alkanes, which comprises bringing into admixture, in the presence of a Friedel-Crafts catalyst, a halogenated methane containing at least 3 halogen atoms attached to the carbon, one of the halogen atoms being a fluorine atom, and a halogenated ethylenic compound having at least one chlorine atom attached to one of the doubly bonded carbon atoms.

3. The process for the preparation of highly halogenated fluoroalkanes, which comprises bringing into admixture, in the presence of a Friedel-Crafts catalyst, a halogenated methane containing at least 3 halogen atoms attached to the carbon, one of the halogen atoms being a fluorine atom, and a chlorinated ethylenic compound having at least one chlorine atom attached to one of the doubly bonded carbon atoms.

4. The process for the preparation of highly halogenated fluoroalkanes, which comprises bringing into admixture, at room temperature, in the presence of a Friedel-Crafts catalyst, a halogenated methane containing at least 3 halogen atoms attached to the carbon and a chlorinated ethylenic compound having at least one chlorine atom attached to one of the doubly bonded carbon atoms, said halogenated methane being further characterized in that it contains one fluorine atom.

5. The process in accordance with claim 4 characterized in that the catalyst is aluminum chloride.

6. The process for the preparation of monofluorohexachloropropanes, which comprises bringing into admixture, at room temperature, in the presence of aluminum chloride, dichloromonofluoromethane and tetrachloroethylene.

7. The process for the preparation of chlorofluoropropanes, which comprises bringing into admixture, in the presence of aluminum chloride, chloroform and chlorotrifluoroethylene.

8. The process for the preparation of chlorofluoropropanes, which comprises bringing into admixture, in the presence of aluminum chloride, carbon tetrachloride and chlorotrifluoroethylene.

PAUL ROLLAND AUSTIN.

REFERENCES CITED

The following references are of record in the file of this patent:

FOREIGN PATENTS

| Number | Country | Date |
|---|---|---|
| 261,689 | Germany | July 2, 1913 |